US012640887B2

(12) United States Patent
Zhang et al.

(10) Patent No.: US 12,640,887 B2
(45) Date of Patent: May 26, 2026

(54) METHODS AND APPARATUS OF RESTRICTION ON LINKED EPDCCH CANDIDATES FOR EPDCCH SOFT COMBINING

(71) Applicant: Lenovo (Beijing) Limited, Beijing (CN)

(72) Inventors: Yi Zhang, Beijing (CN); Chenxi Zhu, Fairfax, VA (US); Bingchao Liu, Beijing (CN); Wei Ling, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 344 days.

(21) Appl. No.: 18/268,783

(22) PCT Filed: Dec. 30, 2020

(86) PCT No.: PCT/CN2020/141459
§ 371 (c)(1),
(2) Date: Jun. 21, 2023

(87) PCT Pub. No.: WO2022/141212
PCT Pub. Date: Jul. 7, 2022

(65) Prior Publication Data
US 2024/0106609 A1     Mar. 28, 2024

(51) Int. Cl.
H04W 48/12     (2009.01)
H04L 5/00     (2006.01)
H04W 72/232     (2023.01)

(52) U.S. Cl.
CPC ......... H04L 5/0053 (2013.01); H04W 72/232 (2023.01)

(58) Field of Classification Search
CPC ... H04L 5/0053; H04L 5/0058; H04L 5/0076; H04W 72/232; H04W 48/12
See application file for complete search history.

(56) References Cited

U.S. PATENT DOCUMENTS

| | | | |
|---|---|---|---|
| 11,659,564 B2 * | 5/2023 | Kwak | H04W 72/23 370/329 |
| 2019/0150073 A1 * | 5/2019 | Tiirola | H04W 72/23 455/434 |

(Continued)

FOREIGN PATENT DOCUMENTS

| | | | |
|---|---|---|---|
| WO | 2018208211 A1 | 11/2018 | |
| WO | WO-2019244223 A1 * | 12/2019 | ............ H04W 72/04 |
| WO | 2020163618 A1 | 8/2020 | |

OTHER PUBLICATIONS

3GPP TSG-RAN WG2#108, R2-1916006 Title: Remaining Issues on user plane aspects (Year: 2019).*

(Continued)

*Primary Examiner* — Faruk Hamza
*Assistant Examiner* — Abusayeed M Haque
(74) *Attorney, Agent, or Firm* — FIG. 1 Patents

(57) ABSTRACT
Methods and apparatus of restriction on linked ePDCCH candidates for ePDCCH soft combining are disclosed. The method includes: receiving, by a receiver, a plurality of Control Resource Set (CORESET) configurations, a plurality of search space set configurations, and a Physical Downlink Control Channel (PDCCH) transmitted with a plurality of repetitions; wherein the plurality of repetitions of the PDCCH are transmitted from a plurality of transmitting-receiving identities, and one CORESET is associated with one search space set; and determining, by a processor, linked monitoring occasions and/or linked candidates for blind detection of the PDCCH with soft combining.

20 Claims, 6 Drawing Sheets

```
┌──────────────────────────────────────────────────────────────────────┐
│                                902                                     │
│  transmitting, by a transmitter, a plurality of CORESET configurations │
│         and a plurality of search space set configurations             │
└──────────────────────────────────────────────────────────────────────┘
                                    │
                                    ▼
┌──────────────────────────────────────────────────────────────────────┐
│                                904                                     │
│  determining, by a processor, linked monitoring occasions and/or       │
│   linked candidates for blind detection of PDCCH with soft combining   │
└──────────────────────────────────────────────────────────────────────┘
                                    │
                                    ▼
┌──────────────────────────────────────────────────────────────────────┐
│                                906                                     │
│   transmitting, by the transmitter, a plurality of repetitions of the  │
│   PDCCH according to the CORESET configurations and/or the search      │
│   space set configurations on the linked monitoring occasions and/or   │
│   linked candidates determined by the processor; wherein the plurality │
│   of repetitions of the PDCCH are transmitted from a plurality of      │
│   transmitting-receiving identities, and one CORESET is associated     │
│                     with one search space set                          │
└──────────────────────────────────────────────────────────────────────┘
```

(56) References Cited

U.S. PATENT DOCUMENTS

| | | | |
|---|---|---|---|
| 2019/0236441 A1* | 8/2019 | Shifren | .................. G06N 3/049 |
| 2019/0349155 A1* | 11/2019 | Xu | ........................ H04L 5/0042 |
| 2021/0144717 A1* | 5/2021 | Tsai | ........................ H04W 8/24 |
| 2022/0132425 A1* | 4/2022 | Seo | ........................ H04W 52/02 |

OTHER PUBLICATIONS

3GPP TSG RAN WG1, Meeting#71, R1-124763 Title: Resource configuration and search space design for E-PDCCH (Year: 2012).*
Interdigital Inc. , "Evaluation of PDCCH repetition for URLLC", 3GPP TSG RAN WG1 Meeting #92bis, R1-1804853, Sanya, China [retrieved Apr. 20, 2023]. Retrieved from the Internet <https://www.3gpp.org/ftp/tsg_ran/WG1_RL1/TSGR1_92b/Docs>., Apr. 2018, 8 Pages.
PCT/CN2020/141459 , "International Preliminary Report on Patentability", PCT Application No. PCT/CN2020/141459, Jul. 4, 2023, 5 pages.
PCT/CN2020/141459 , "International Search Report and Written Opinion", PCT Application No. PCT/CN2020/141459, Sep. 22, 2021, 7 pages.

* cited by examiner

Configure 4 candidates

512

Candidates in SS set 1

Generate by wrap around

514

Candidates in SS set 2

Configure 2 candidates

522

Candidates in SS set 1

Generate by truncation

524

Candidates in SS set 2

METHODS AND APPARATUS OF RESTRICTION ON LINKED EPDCCH CANDIDATES FOR EPDCCH SOFT COMBINING

FIELD

The subject matter disclosed herein relates generally to wireless communication and more particularly relates to, but not limited to, methods and apparatus of restriction on linked enhanced Physical Downlink Control Channel (ePDCCH) candidates for ePDCCH soft combining.

BACKGROUND

The following abbreviations and acronyms are herewith defined, at least some of which are referred to within the specification:

Third Generation Partnership Project (3GPP), 5th Generation (5G), New Radio (NR), 5G Node B (gNB), Long Term Evolution (LTE), LTE Advanced (LTE-A), E-UTRAN Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Physical Downlink Control Channel (PDCCH), Enhanced Physical Downlink Control Channel (EPDCCH), Control Channel Element (CCE), Control Resource Set (CORESET), Downlink Control Information (DCI), Frequency-Division Multiplexing (FDM), Frequency Division Multiple Access (FDMA), Identification (ID), Information Element (IE), Physical Resource Block (PRB), Single Frequency Network (SFN), Time-Division Multiplexing (TDM), Transmit Receive Point (TRP), Frequency Range 1 (FR1), Frequency Range 2 (FR2), Technical Specification (TS), Search Space (SS).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs (Transmit Receive Points) are studied. A TRP is an apparatus to transmit and receive signals, and is controlled by a gNB through the backhaul between the gNB and the TRP. A TRP may also be referred to as a transmitting-receiving identity, or simply an identity.

In current NR system, Physical Downlink Control Channel (PDCCH) is transmitted from a single TRP. With multiple TRPs, time-frequency resources for PDCCH transmission may be from multiple TRPs. The spatial diversity may be exploited in addition to the time-frequency diversity. Enhanced Physical Downlink Control Channel (ePDCCH) allows exploitation of the resources from multiple TRPs to improve PDCCH transmission reliability and robustness. Multiple transmissions of the ePDCCH may be transmitted from a same TRP or some different TRPs.

SUMMARY

Methods and apparatus of restriction on linked ePDCCH candidates for ePDCCH soft combining are disclosed.

According to a first aspect, there is provided a method, including: receiving, by a receiver, a plurality of Control Resource Set (CORESET) configurations, a plurality of search space set configurations, and a Physical Downlink Control Channel (PDCCH) transmitted with a plurality of repetitions; wherein the plurality of repetitions of the PDCCH are transmitted from a plurality of transmitting-receiving identities, and one CORESET is associated with one search space set; and determining, by a processor, linked monitoring occasions and/or linked candidates for blind detection of the PDCCH with soft combining.

According to a second aspect, there is provided a method, including: transmitting, by a transmitter, a plurality of Control Resource Set (CORESET) configurations, a plurality of search space set configurations, and a Physical Downlink Control Channel (PDCCH) transmitted with a plurality of repetitions; wherein the plurality of repetitions of the PDCCH are transmitted from a plurality of transmitting-receiving identities, and one CORESET is associated with one search space set; wherein the CORESET configurations and/or search space set configurations are for blind detection of linked monitoring occasions and/or linked candidates of the PDCCH with soft combining.

According to a third aspect, there is provided an apparatus, including: a receiver that receives a plurality of Control Resource Set (CORESET) configurations, a plurality of search space set configurations, and a Physical Downlink Control Channel (PDCCH) transmitted with a plurality of repetitions; wherein the plurality of repetitions of the PDCCH are transmitted from a plurality of transmitting-receiving identities, and one CORESET is associated with one search space set; and a processor that determines linked monitoring occasions and/or linked candidates for blind detection of the PDCCH with soft combining.

According to a fourth aspect, there is provided an apparatus, including: a transmitter that transmits a plurality of Control Resource Set (CORESET) configurations, a plurality of search space set configurations, and a Physical Downlink Control Channel (PDCCH) transmitted with a plurality of repetitions; wherein the plurality of repetitions of the PDCCH are transmitted from a plurality of transmitting-receiving identities, and one CORESET is associated with one search space set; wherein the CORESET configurations and/or search space set configurations are for blind detection of linked monitoring occasions and/or linked candidates of the PDCCH with soft combining.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
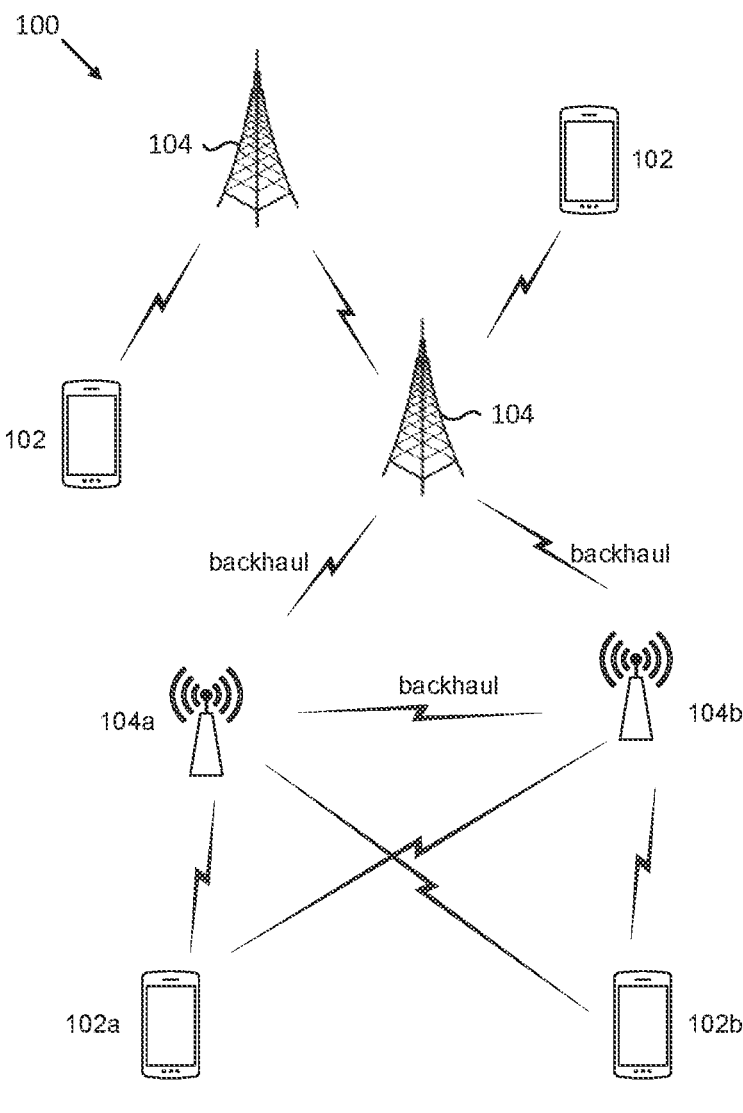
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported.

Figure 2:
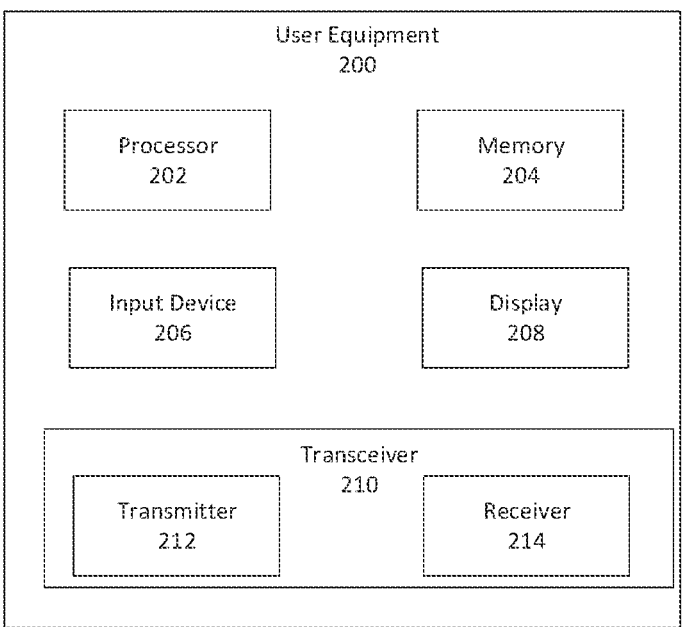
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
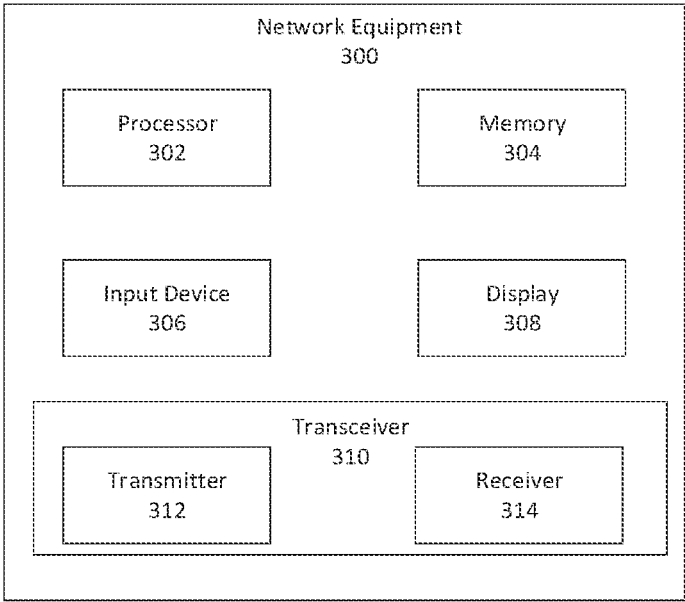
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

For normal PDCCH, a Downlink Control Information (DCI) is transmitted on only one candidate. However, for ePDCCH (enhanced PDCCH) transmission, one DCI may be transmitted with multiple candidates with repetitions from multiple TRPs to improve reliability, i.e., multiple candidates with multiple repeat transmissions may be used for enhanced PDCCH transmission.

For non-SFN (Single Frequency Network) based mTRP (multiple-TRP) PDCCH reliability enhancements, different encoding/rate matching options are possible. In one of the options, the encoding/rate matching is based on one repetition, and the same coded bits are repeated for the other repetition. Each repetition has the same number of Control Channel Elements (CCEs) and coded bits, and corresponds to the same DCI payload.

The PDCCH candidates may be linked with one another for transmissions of the PDCCH. In one of the cases, two or more enhanced PDCCH candidates for one DCI transmission are explicitly linked together and UE knows explicitly the linkage among these enhanced PDCCH candidates before decoding.

It is important to set up linkage between candidates since it can reduce blind detection complexity remarkably and make combination scheme acceptable from the view of realization complexity.

According to current working assumption, two Search Space (SS) sets associated with corresponding CORESETs are supported. However, actual configuration for CORESET and search space set is not provided, where the resources for PDCCH candidates come from CORESET and PDCCH candidates are defined from search space set.

In the disclosure, the configurations for CORESET and search space set are provided to facilitate soft combining between candidates. In detail, a new set of combining candidates and a new combining candidate number are defined to facilitate soft combining. Some parameters between CORESETs can be configured with specific restriction to simplify combining scheme. Restriction on monitoring occasions of combined candidates is proposed. Specifically, the monitoring window or OFDM symbol/slot offset can be used to find the monitoring occasions of the combined candidates.

The Information Element (IE) ControlResourceSet is used to configure a time-frequency control resource set (CORESET) in which to search for downlink control information. The parameters duration, and frequencyDomainResources can be used to determine the size of time-frequency resource set for PDCCH transmission. An example of ControlResourceSet IE is shown as follows.

---

ControlResourceSet information element

---

```
-- ASN1START
-- TAG-CONTROLRESOURCESET-START
ControlResourceSet ::=              SEQUENCE {
  controlResourceSetId             ControlResourceSetId,
  frequencyDomainResources         BIT STRING (SIZE (45)),
  duration                         INTEGER (1..maxCoReSetDuration),
  cce-REG-MappingType              CHOICE {
    interleaved                          SEQUENCE {
      reg-BundleSize                         ENUMERATED {n2, n3, n6},
      interleaverSize                        ENUMERATED {n2, n3, n6},
      shiftIndex
INTEGER(0..maxNrofPhysicalResourceBlocks-1)      OPTIONAL -- Need S
    },
    nonInterleaved                       NULL
  },
  precoderGranularity              ENUMERATED {sameAsREG-bundle,
allContiguousRBs},
  tci-StatesPDCCH-ToAddList        SEQUENCE(SIZE (1..maxNrofTCI-StatesPDCCH))
OF TCI-StateId OPTIONAL, -- Cond NotSIB1-initialBWP
  tci-StatesPDCCH-ToReleaseList    SEQUENCE(SIZE (1..maxNrofTCI-StatesPDCCH))
OF TCI-StateId OPTIONAL, -- Cond NotSIB1-initialBWP
  tci-PresentInDCI                       ENUMERATED {enabled}
OPTIONAL, -- Need S
  pdcch-DMRS-ScramblingID                INTEGER (0..65535)
OPTIONAL, -- Need S
  ...,
  [[
  rb-Offset-r16                          INTEGER (0..5)
OPTIONAL, -- Need N
  tci-PresentInDCI-ForDCI-Format1-2-r16  INTEGER (1..3)
OPTIONAL, -- Need S
  coresetPoolIndex-r16                   INTEGER (0..1)
OPTIONAL, -- Need R
  controlResourceSetId-r16               ControlResourceSetId-r16
OPTIONAL -- Need S
  ]]
}
-- TAG-CONTROLRESOURCESET-STOP
-- ASN1STOP
```

---

The Information Element (IE) SearchSpace defines how or where to search for PDCCH candidates, where each search space set is associated with one ControlResourceSet. Time domain behaviour for monitoring is defined by parameters monitoringSlotPeriodicityAndOffset, duration and monitoringSymbolsWithinSlot. The supported aggregation level and candidate number for each aggregation level can be flexibly configured. The SearchSpace Information Element in TS 38.331 is described as follows.

---

SearchSpace information element

---

```
SearchSpace ::=                     SEQUENCE {
  searchSpaceId                     SearchSpaceId,
  controlResourceSetId              ControlResourceSetId
OPTIONAL,            -- Cond SetupOnly
  monitoringSlotPeriodicityAndOffset  CHOICE {
    sl1                               NULL,
    sl2                               INTEGER (0..1),
    ...
  }
OPTIONAL,          -- Cond Setup
  duration                          INTEGER (2..2559)
OPTIONAL,          -- Need R
  monitoringSymbolsWithinSlot       BIT STRING (SIZE (14))
OPTIONAL,          -- Cond Setup
  nrofCandidates                    SEQUENCE {
    aggregationLevel1                   ENUMERATED {n0, n1, n2, n3, n4, n5,
n6, n8},
    aggregationLevel2                   ENUMERATED {n0, n1, n2, n3, n4, n5,
n6, n8},
    aggregationLevel4                   ENUMERATED {n0, n1, n2, n3, n4, n5,
n6, n8},
```

-continued

| SearchSpace information element | | |
| --- | --- | --- |
| aggregationLevel8<br>n6, n8}, | | ENUMERATED {n0, n1, n2, n3, n4, n5, |
| aggregationLevel16<br>n6, n8}<br>} | | ENUMERATED {n0, n1, n2, n3, n4, n5, |
| OPTIONAL,<br>searchSpaceType<br>common | -- Cond Setup | CHOICE {<br>SEQUENCE { |
| ...<br>OPTIONAL,<br>},<br>ue-Specific<br><br>formats0-1-And-1-1},<br><br>}<br>}<br>OPTIONAL<br>} | -- Need R<br><br>dci-Formats<br><br>...<br><br>-- Cond Setup | SEQUENCE {<br>ENUMERATED {formats0-0-And-1-0, |

The mapping between Control Channel Element (CCE) and search space set is defined in TS 38.213 as follows.

---

For a search space set s associated with CORESET p, the CCE indexes for aggregation level L corresponding to PDCCH candidate $m_{s,n_{CI}}$ of the search space set in slot $n_{s,f}^\mu$ for an active DL BWP of a serving cell corresponding to carrier indicator field value $n_{CI}$ are given by $$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i$$

where
for any CSS, $Y_{p,n_{s,f}^\mu} = 0$;
for a USS, $Y_{p,n_{s,f}^\mu} = (A_p \cdot Y_{p,n_{s,f}^{-1}\mu}) \mod D$, $Y_{p,-1} = n_{RNTI} \neq 0$, $A_p = 39827$ for pmod3 = 0, $A_p = 39829$ for pmod3 = 1, $A_p = 39839$ for pmod3 = 2, and D = 65537;
i = 0, . . . , L − 1;
$N_{CCE,p}$ is the number of CCEs, numbered from 0 to $N_{CCE,p}$ − 1, m CORESET p and, if any, per RB set;
$n_{CI}$ is the carrier indicator field value if the UE is configured with a carrier indicator field by
CrossCarrierSchedulingConfig for the serving cell on which PDCCH is monitored; otherwise, including for any CSS, $n_{CI} = 0$;
$m_{s,n_{CI}} = 0, . . . , M_{s,n_{CI}}^{(L)} - 1$, where $M_{s,n_{CI}}^{(L)}$ is the number of PDCCH candidates the UE is configured to monitor for aggregation level L of a search space set s for a serving cell corresponding to $n_{CI}$;
for any CSS, $M_{s,max}^{(L)} = M_{s,0}^{(L)}$;
for a USS, $M_{s,max}^{(L)}$ is the maximum of $M_{s,n_{CI}}^{(L)}$ over all configured $n_{CI}$ values for a CCE aggregation level L of search space set s ;
the RNTI value used for $n_{RNTI}$ is the C-RNTI.

---

Based on the above formula, the starting CCE is the same for different aggregation levels, and the PDCCH candidates are distributed uniformly in the search space set based on the PDCCH candidate number.

In the disclosure, restriction on ePDCCH candidates is proposed to facilitate soft combining, where repeated PDCCHs are transmitted from multiple CORESETs from multiple TRPs and one search space set is associated with one CORESET.

With soft combining, combining gain can be achieved to improve PDCCH transmission reliability, but it may bring additional decoding complexity.

With explicit linkage, the decoding complexity may be reduced remarkably to be acceptable from realization complexity view. To simplify scheme for linking candidates, some restrictions may be introduced.

For candidates in one monitoring occasion, the specified or configured candidate number and/or the set of selected PDCCH candidates may be used to determine or restrict the candidates for soft combining.

For monitoring occasions of linked candidates, OFDM symbol offset, or slot offset, or monitoring window, is proposed to select candidates for soft combining.

Restrictions on PDCCH Candidates for Soft Combining by Specified or Configured Set of Selected PDCCH Candidates In current search space, the candidate number is configured per aggregation level. The CCEs corresponding to one candidate can be determined in the search space set according to search space set definition in TS 38.214. For ePDCCH transmission, multiple search space sets are configured corresponding to multiple CORESETs. The candidate number configured in each search space set may be different on account of independent configuration. The selection of candidates for soft combining may be based on two alternative assumptions. In different assumptions, the configurations of the CORESETs and/or the configurations of the search space sets may be provided with or without restrictions.

For the first assumption, there is a restriction that the same candidate number per aggregation level is configured for the multiple search space sets.

One basic scheme is a one-to-one mapping between candidates in two search space sets, where one candidate in one search space set is linked with one candidate in another search space set. For example, the k-th candidate in the search space set 1 is linked with the k-th candidate in the search space set 2, where the first candidate starts from the starting CCE in the corresponding search space set. To guarantee the same number of candidates for multiple search space sets, the OFDM symbols derived by parameter duration and the Physical Resource Block (PRB) number derived by frequencyDomainResources may be constrained as the same for the two CORESETS corresponding to the two search space sets. Alternatively, the time-frequency resources for the two search space sets, i.e., the CCE number, may be constrained as the same.

In this case, the UE is expected to be configured with the same value for OFDM symbol number and PRB number, or the same number of CCE, between multiple CORESETs to simplify one-to-one mapping between linked candidates for soft combining.

For further enhanced scheme, the candidates for soft combining may be selected from candidates in the search space set. The selection is made to guarantee maximum overlapping for actual physical resources between candidates of all aggregation levels to reduce the total number of CCEs required for processing, including channel estimation. In this way, the non-overlapping CCE number is kept as minimum as possible. With this selection scheme, it may reduce channel estimation complexity with smaller number of non-overlapped CCEs.

Figure 4:
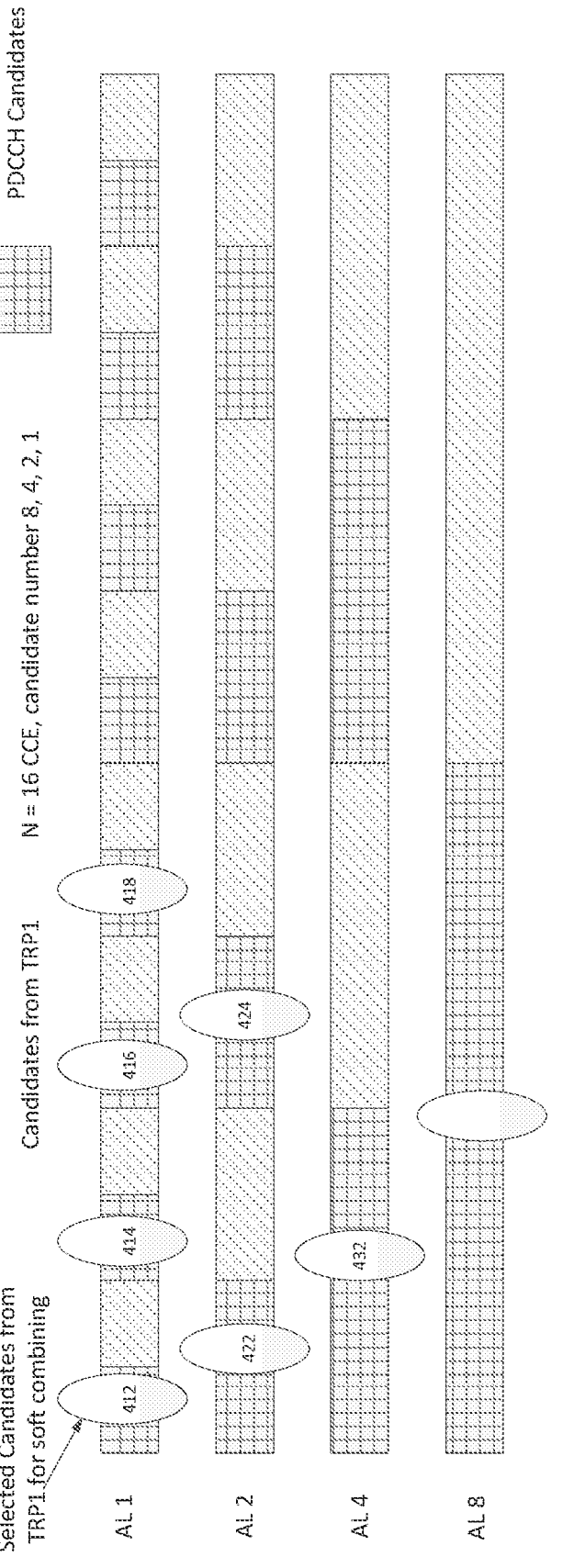
FIG. 4 is a schematic diagram illustrating an example of configured set of selected candidates for soft combining to reduce channel estimation complexity in accordance with some implementations of the present disclosure.

FIG. 4 is a schematic diagram illustrating an example of the configured set of selected candidates for soft combining to reduce channel estimation complexity in accordance with some implementations of the present disclosure. In this example, there are 16 CCEs in one CORESET. 8, 4, 2, and 1 candidate may be configured for aggregation levels 1, 2, 4, and 8, respectively. The candidates may be derived as block with grid according to search space definition in Release 15.

On account of small number of UE with ePDCCH transmission in a cell, some candidates for soft combining may be selected from candidates of the search space set. In the example shown in FIG. 4, candidates {1,2,3,4} (412, 414, 416, 418) are selected from 8 candidates with aggregation level 1 (AL 1); candidates {1,2} (422, 424) are selected from 4 candidates with aggregation level 2 (AL 2); and candidate {1} (432) is selected from 2 candidates with aggregation level 4 (AL 4).

With this selection scheme, the non-overlapped CCEs are concentrated in the left area of the search space, whereas non-overlapped CCEs would distributed evenly in the whole search space for conventional scheme. It can reduce non-overlapping CCE number, and thus reduce decoding complexity.

To realize this scheme, per aggregation level configured parameter, nrofcandidateCombination, may be introduced to indicate the selected candidate number for soft combining; and per aggregation level configured parameter, candidate-Combination may be introduced to indicate the selected candidates for soft combining. For candidateCombination, it may be realized by selection bitmap based on the configured PDCCH candidates.

That is, a configured set of selected candidates, which may be referred to as a selected set of candidates, per aggregation level, is introduced to reduce channel estimation complexity with smaller number of non-overlapped CCEs.

For the second assumption, a flexible candidate number per aggregation level may be configured on account of independent configuration for multiple search space sets.

Under this assumption, different PRB numbers for multiple CORESETs may be used for FDM based ePDCCH transmission scheme; and different OFDM symbol numbers for multiple CORESETs may be used for TDM based ePDCCH transmission scheme. The number of candidates used for soft combining (i.e., soft combination candidate number N) may be configured. For example, it may be the candidate number of the first search space set M1, or that of the second search space set M2. Based on the configured candidate number for soft combining, truncation or wrapping around scheme can be used when the configured candidate number for soft combining is no larger or no smaller than the configured candidate number for the search space set, respectively.

Figure 5A:
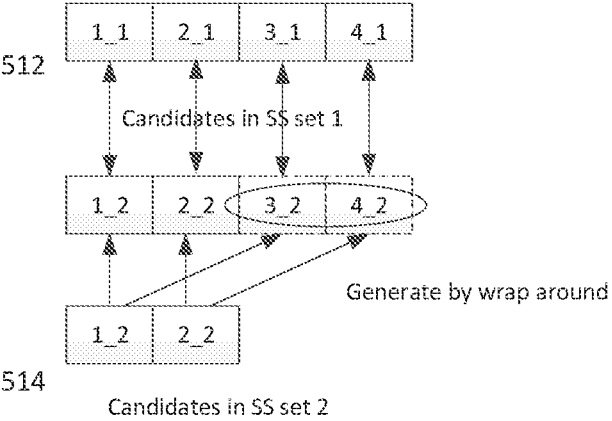
FIGS. 5A and 5B are schematic diagrams illustrating examples of finding linked candidates by wrapping around and truncation schemes in accordance with some implementations of the present disclosure.
Figure 5B:
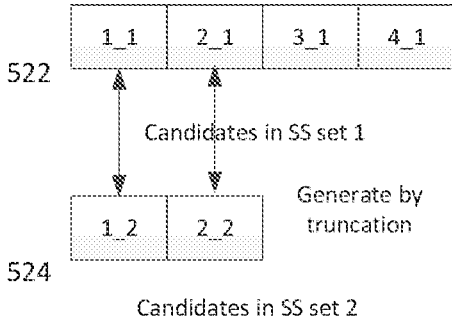

FIGS. 5A and 5B are schematic diagrams illustrating examples of finding linked candidates by wrapping around and truncation schemes in accordance with some implementations of the present disclosure. For wrapping around scheme as shown in FIG. 5A, the candidates can be reselected (i.e., repetitively selected) as candidates for soft combing after all the candidates are used once. For truncation scheme as shown in FIG. 5B, only the candidates with smaller indexes are selected as candidates for combining.

In the examples shown in FIGS. 5A and 5B, 4 and 2 candidates are configured for search space set 1 (512, 522), and search space set 2 (514, 524), respectively (i.e. M1=4, M2=2).

When the configured candidate number for soft combination is 4 (i.e., soft combination candidate number N=4) as shown in FIG. 5A, because there are only 2 candidates in search space set 2 (514), wrapping around scheme is used. Thus, the candidates {1,2,3,4} (i.e. candidates 1_1, 2_1, 3_1, and 4_1) from search space set 1 (512) are linked with candidates {1, 2, 1, 2} (i.e. candidates 1_2, 2_2, 3_2, and 4_2) from search space set 2 (514), respectively. Here, candidate 3_2 is a reuse of candidate 1_2 and candidate 4_2 is a reuse of candidate 2_2.

When 2 candidates are configured as candidate number for soft combination (i.e., soft combination candidate number N=2) as shown in FIG. 5B, only 2 candidates from search space set 1 (522) are selected to make soft combining with the 2 candidates from search space set 2 (524), and truncation scheme can be used. Thus, the first 2 candidates, i.e. {1, 2} (i.e. candidates 1_1 and 2_1) from search space set 1 (522), are selected and linked with candidate {1, 2} (i.e. candidates 1_2 and 2_2) from search space set 2 (524) for soft combining, respectively.

For simplicity, direct restriction may be used in case of different configured candidate numbers for multiple search space sets. For example, only the smaller configured candidate number M among multiple search space sets is used as the candidate number N for soft combining. Then, truncation scheme may be used under this restriction.

That is, a configured PDCCH candidate number is introduced to select candidates for soft combination when different candidate numbers are configured for multiple search space sets. Alternatively, UE is expected that a smaller PDCCH candidate number is used for soft combining. Wrapping around scheme or truncation scheme can be used when the configured candidate number for soft combining is not the same as the configured candidate number for corresponding search space set.

As another flexible scheme, UE may receive a configured PDCCH candidate number and/or a configuration parameter indicating a selection bitmap of candidates from each of the search space sets to select the candidates for soft combining. For one scheme, the selection bitmap will indicate each candidate in a search space set that is selected and linked to a candidate in another search space set. For another scheme, the indicated paired candidates can be indicated by two bitmaps, respectively. They are paired by one-one mapping scheme. In these cases, since the linked candidates are specifically configured, UE may make soft combination on linked candidates based on indication of the bitmap directly, without relying on either wrapping around scheme or truncation scheme.

Restriction on PDCCH Candidates for Soft Combining by Specified PDCCH Monitoring Occasions Based on current working assumption, PDCCH candidates for soft combining may come from different search space sets. There are multiple monitoring occasions in one search space set. To simplify or clarify combining behaviour, the monitoring occasions for candidates with soft combining may be specified. Monitoring occasion defined in current 3GPP specification is determined by parameters, i.e., monitoringSlotPeriodicityAndOffset, duration and monitoringSymbolsWithinSlot. On account of independent parameter configuration for each search space set, alternative assumptions may be made for specifying PDCCH monitoring occasions for soft combining. In different assumptions, the configurations of the CORESETs and/or the configurations of the search space sets may be provided with or without restrictions.

For the first assumption, some restrictions are made to simplify specifying PDCCH monitoring occasions.

For FDM based ePDCCH transmission scheme, the monitoring occasions are the same for combined candidates. Thus, UE is expected the same values for parameters, i.e., monitoringSlotPeriodicityAndOffset, duration and monitoringSymbolsWithinSlot.

For slot level TDM scheme, UE is expected the same values for parameters, i.e., periodicity derived by monitoringSlotPeriodicityAndOffset, duration and monitoringSymbolsWithinSlot. Slot level offset is assumed between combined candidates.

For sub-slot level TDM scheme, UE is expected the same values for parameters, i.e. monitoringSlotPeriodicityAndOffset, and duration. Symbol level offset is assumed between combined candidates.

With this assumption, the candidates with an offSet from two search space sets will be selected for soft combining. In detail, for FDM scheme, UE will make soft combination for candidate 1 from the first search space set and candidate 2 from the second search space set with the same time occasion; for slot and sub-slot level TDM scheme, UE will make soft combination for candidate 1 from the first search space set and candidate 2 from the second search space set with a fixed offset, where the offset value can slot or OFDM symbol difference value between time domain configurations of the search space sets.

For slot level based TDM scheme, the offset value may be obtained by differentiation value between monitoringSlotPeriodicityAndOffset of the two search space sets, i.e., $$\text{Offset Value} = monitoringSlotPeriodicityAndOffset\ 2\ - \\ monitoringSlotPeriodicityAndOffset\ 1$$

where monitoringSlotPeriodicityAndOffset 1 and monitoringSlotPeriodicityAndOffset 2 are derived from configuration parameters of search space set 1 and search space set 2, respectively.

For sub-slot level based TDM scheme, the offset value may be obtained by differentiation value between monitoringSymbolsWithinSlot of the two search space sets, i.e., $$\text{Offset Value} = \\ \text{the first non-zero symbol index derived by } monitoringSymbolsWithinSlot\ 2\ - \\ \text{the first non-zero symbol index derived by } monitoringSymbolsWithinSlot\ 1$$

where monitoringSymbolsWithinSlot 1 and monitoringSymbolsWithinSlot 2 are derived from configuration parameters of search space set 1 and search space set 2, respectively.

Figure 6:
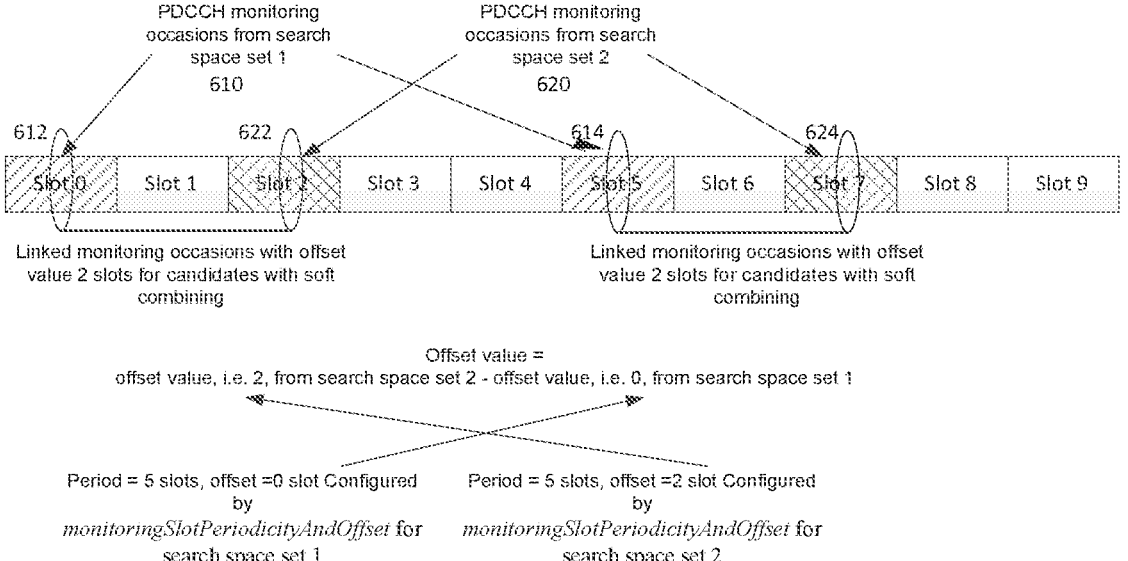
FIG. 6 is a schematic diagram illustrating an example of finding linked monitoring occasions with candidates for soft combining in accordance with some implementations of the present disclosure.

FIG. 6 is a schematic diagram illustrating an example of finding linked monitoring occasions with candidates for soft combining in accordance with some implementations of the present disclosure. The example illustrates how to find linked monitoring occasions with candidates for soft combining for slot level TDM based enhanced PDCCH transmission. In this example, period is 5 slots and offset is 0 slots for search space set 1, and period is 5 slots and offset is 2 slots for search space set 2. These are derived by corresponding configured parameter monitoringSlotPeriodicityAndOffset. Time domain parameters, i.e., periodicity derived by monitoringSlotPeriodicityAndOffset, duration and monitoringSymbolsWithinSlot are the same. PDCCH monitoring occasion 612 and PDCCH monitoring occasion 614 are from search space set 1 (610); PDCCH monitoring occasion 622 and PDCCH monitoring occasion 624 are from search space set 2 (620). UE is expected that the linked monitoring occasions for linked candidates having a spacing as the differentiation value between offset values of two search space sets. i.e., 2 slots. That is, PDCCH monitoring occasion 622 (slot 2) is linked with PDCCH monitoring occasion 612 (slot 0), and PDCCH monitoring occasion 624 (slot 7) is linked with PDCCH monitoring occasion 614 (slot 5).

Thus, UE is expected the same values for parameters, i.e. monitoringSlotPeriodicityAndOffset, duration and monitoringSymbolsWithinSlot for FDM based scheme; or the same values for parameters, i.e. periodicity derived by monitoringSlotPeriodicityAndOffset, duration and monitoringSymbolsWithinSlot for slot level TDM based scheme; or the same values for parameters, i.e. monitoringSlotPeriodicityAndOffset, and duration for sub-slot level TDM based scheme. The candidates from monitoring occasions of two search space sets may be selected for soft combining, which may be slot offset or symbol offset by a differentiation value between time domain configurations of two search space sets for slot level based or sub-slot level based TDM scheme.

For the second assumption, there is no restriction for multiple search space set configurations.

The time location for PDCCH monitoring occasions of two search space sets may be flexibly configured. A specific monitoring window is proposed to find linked monitoring occasions for the candidates with soft combining. One specific monitoring window is defined for one monitoring occasion in one search space set, or a reference search space set, and is used to find the linked monitoring occasion in another search space set, where the candidates in these two monitoring occasions may be selected for soft combining.

The reference search space set may be flexibly selected or configured as any search space set in principle. As an example, the search space set with lower ID index may be considered as the reference search space set for simplicity.

The starting time location of the monitoring occasion in the reference search space set may serve as a starting position of corresponding specific monitoring window. The length of specific monitoring window may be configured. For example, it may be 0 symbol for FDM based transmission scheme, 14 symbols for sub-slot transmission scheme, or 2 slots for slot level transmission scheme. Based on the specific monitoring window, UE may find the PDCCH monitoring occasion with minimum spacing between the starting location of the monitoring occasion from the second search space set and the staring location of the proposed specific monitoring window, and where the derived minimum spacing is no larger than the length of specific monitoring window. The monitoring occasion in the reference search space set and the selected monitoring occasion are used as linked PDCCH monitoring occasions, and only candidates from linked PDCCH monitoring occasions can be made soft combining.

Figure 7:
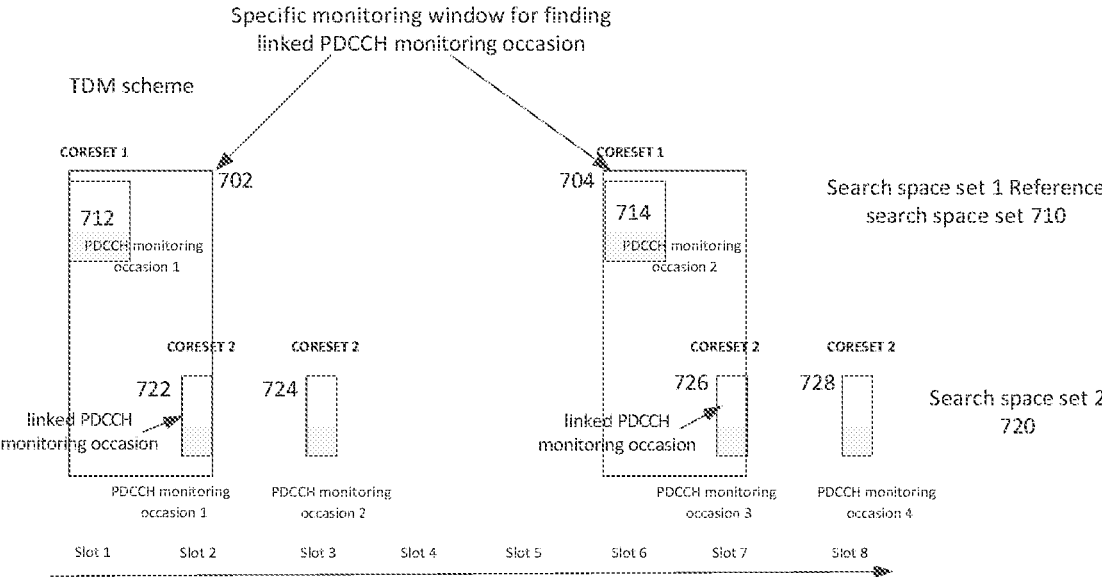
FIG. 7 is a schematic diagram illustrating an example of finding linked PDCCH monitoring occasions for soft combining by specific monitoring window in accordance with some implementations of the present disclosure.

FIG. 7 is a schematic diagram illustrating an example of finding linked PDCCH monitoring occasions for soft combining by specific monitoring window in accordance with some implementations of the present disclosure. In this example, search space set 1 (710) is used as the reference search space set and 2 slots as the monitoring window length. The specific monitoring window for finding linked PDCCH monitoring occasion for PDCCH monitoring occasion 1 (712) in the reference search space set starts from the starting time location of the PDCCH monitoring occasion 1 (712) and lasts for 2 slots. The specific monitoring window for finding linked PDCCH monitoring occasion for PDCCH monitoring occasion 2 (714) in the reference search space set starts from the starting time location of the PDCCH monitoring occasion 1 (714) and lasts for 2 slots. PDCCH monitoring occasion 1 (722) and PDCCH monitoring occasion 3 (726) in the search space set 2 (720) are selected as linked PDCCH monitoring occasions for PDCCH monitoring occasion 1 (712) and PDCCH monitoring occasion 2 (714) in the search space set 1 (710), i.e. the reference search space set, respectively, since they are PDCCH monitoring occasions with minimum spacing in the corresponding specific monitoring windows. PDCCH monitoring occasion 2 (724) or PDCCH monitoring occasion 4 (728) in the search space set 2 (720) is not in the specific monitoring window, and is not linked PDCCH monitoring occasion for PDCCH monitoring occasion 1 (712) or PDCCH monitoring occasion 2 (714).

That is, a specific monitoring window is used for finding linked PDCCH monitoring occasion in another search space set corresponding to one PDCCH occasion in one search space set, where candidates with soft combining are transmitted on the PDCCH monitoring occasion and linked PDCCH monitoring occasion. A PDCCH monitoring occasion is selected as linked monitoring occasion for the monitoring occasion in the reference search space set (i.e., the first search space set), where the selected PDCCH monitoring occasion has minimum spacing between starting location of monitoring occasion from the second search space set and staring location of the proposed specific monitoring window and this minimum spacing is no larger than the length of specific monitoring window. The search space set with lower ID index may be considered as the reference search space set for simplicity.

Figure 8:
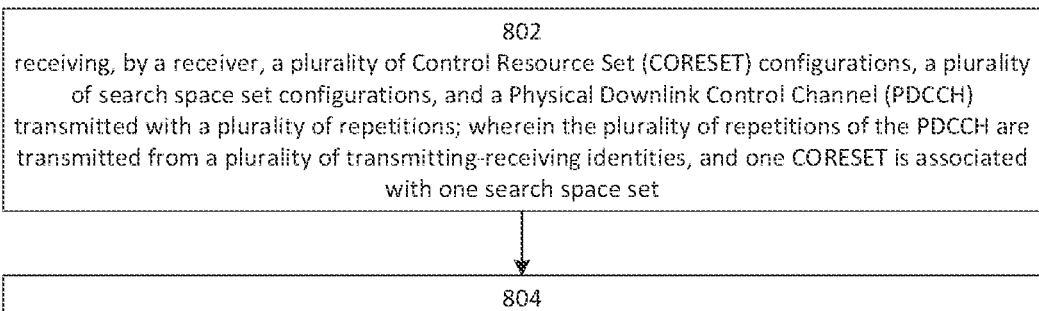
FIG. 8 is a flow chart illustrating steps of restriction on linked ePDCCH candidates for ePDCCH soft combining by UE in accordance with some implementations of the present disclosure.

FIG. 8 is a flow chart illustrating steps of restriction on linked ePDCCH candidates for ePDCCH soft combining by UE 200 in accordance with some implementations of the present disclosure.

At step 802, the receiver 214 of UE 200 receives a plurality of Control Resource Set (CORESET) configurations, a plurality of search space set configurations, and a Physical Downlink Control Channel (PDCCH) transmitted with a plurality of repetitions; wherein the plurality of repetitions of the PDCCH are transmitted from a plurality of transmitting-receiving identities, and one CORESET is associated with one search space set.

At step 804, the processor 202 of UE 200 determines linked monitoring occasions and/or linked candidates for blind detection of the PDCCH with soft combining.

Figure 9:
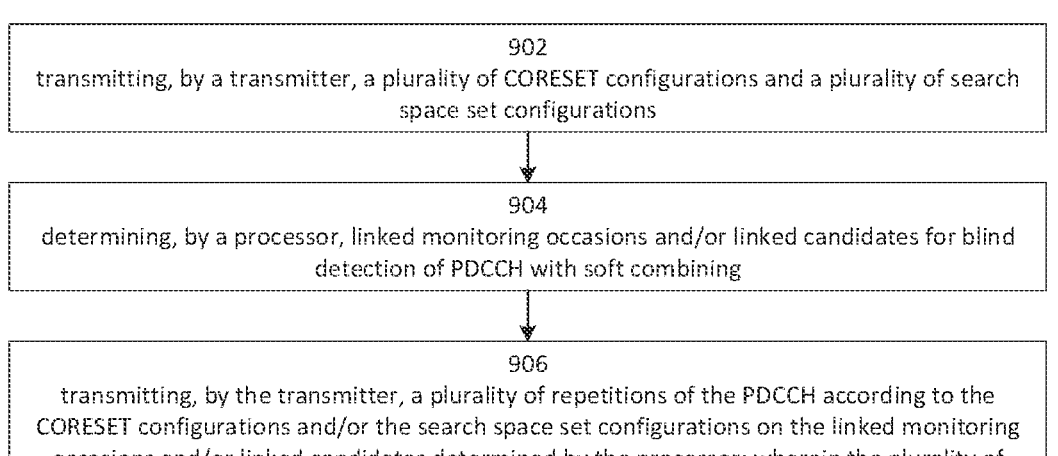
FIG. 9 is a flow chart illustrating steps of restriction on linked ePDCCH candidates for ePDCCH soft combining by gNB or NE in accordance with some implementations of the present disclosure.

FIG. 9 is a flow chart illustrating steps of restriction on linked ePDCCH candidates for ePDCCH soft combining by gNB or NE 300 in accordance with some implementations of the present disclosure.

At step 902, the transmitter 312 of NE 300 transmits a plurality of CORESET configurations and a plurality of search space set configurations.

At step 904, the processor 302 determines linked monitoring occasions and/or linked candidates for blind detection of PDCCH with soft combining.

At step 906, the transmitter 312 of NE 300 further transmits a plurality of repetitions of the PDCCH according to the CORESET configurations and/or the search space set configurations on the linked monitoring occasions and/or linked candidates determined by the processor 302; wherein the plurality of repetitions of the PDCCH are transmitted from a plurality of transmitting-receiving identities, and one CORESET is associated with one search space set.

In one aspect, some items as examples of the disclosure concerning a method of a UE or remote device may be summarized as follows:

1. A method, comprising:
   receiving, by a receiver, a plurality of Control Resource Set (CORESET) configurations, a plurality of search space set configurations, and a Physical Downlink Control Channel (PDCCH) transmitted with a plurality of repetitions; wherein the plurality of repetitions of the PDCCH are transmitted from a plurality of transmitting-receiving identities, and one CORESET is associated with one search space set; and
   determining, by a processor, linked monitoring occasions and/or linked candidates for blind detection of the PDCCH with soft combining.

2. The method of item 1, wherein it is expected that the plurality of CORESET configurations have the same value for Orthogonal Frequency Division Multiplexing (OFDM) symbol number and Physical Resource Block (PRB) number.

3. The method of item 1, wherein it is expected that the plurality of CORESET configurations have the same value for Control Channel Element (CCE) number.

4. The method of item 1, wherein each search space set configuration comprises a selected set of PDCCH candidates per aggregation level for selecting candidates from the search space set for soft combining.

5. The method of any one of items 2 to 4, wherein the linked candidates are determined from two search space sets or two selected sets of PDCCH candidates with a one-to-one mapping scheme for soft combining.

6. The method of item 4, wherein the linked candidates are determined from two selected sets of PDCCH candidates for each aggregation level with maximizing overlapping between CCEs of different aggregation levels.

7. The method of item 1, further comprising configuring a soft combination candidate number N for selection of candidates from a search space set configured by one of the search space set configurations.

8. The method of item 1, wherein a soft combination candidate number N is determined as a smaller one of configured PDCCH candidate numbers M among the plurality of search space sets.

9. The method of item 7 or 8, further comprising, upon determining that the soft combination candidate number N is not larger than a configured candidate number M in a search space set, selecting the first N candidates from the M configured candidates for soft combining.

10. The method of item 7 or 8, further comprising, upon determining that the soft combination candidate number N is larger than a configured candidate number M in a search space set, selecting the first N candidates among a concatenated repetitions of the M configured candidates.

11. The method of item 7 or 8, wherein, upon determining that a first search space set has a configured candidate number M1, and a second search space set has a configured candidate number M2, the receiver further receives a configuration parameter indicating a selection bitmap of candidates from each of the first and second search space sets.

12. The method of item 1, wherein it is expected that:
parameters of monitoringSlotPeriodicityAndOffset, duration and monitoringSymbolsWithinSlot for the associated search space sets are configured with the same values for FDM based scheme;
parameters of duration, monitoringSymbolsWithinSlot and a periodicity derived by monitoringSlotPeriodicityAndOffset for the associated search space sets are configured with the same values for slot level TDM based scheme; and
parameters of monitoringSlotPeriodicityAndOffset, and duration for the associated search space sets are configured with the same values for sub-slot level TDM based scheme.

13. The method of item 1, wherein the linked monitoring occasions are determined with slot offset, or symbol offset, based on a difference between time domain configurations from two search space sets for slot level based, or sub-slot level based, TDM scheme, respectively.

14. The method of item 14, wherein for slot level based TDM scheme, the slot offset is obtained by a differential value between slot offset value derived by monitoringSlotPeriodicityAndOffset of the two search space sets; and for sub-slot level based TDM scheme, the symbol offset is obtained by a differential value between first non-zero symbol indexes derived by monitoringSymbolsWithinSlot of the two search space sets.

15. The method of item 1, further comprising determining a specific monitoring window for the linked monitoring occasions having a first monitoring occasion in a first search space set; wherein a second monitoring occasion in a second search space set is selected with a minimum spacing between a starting time location of the second monitoring occasion and a starting time location of the specific monitoring window; and wherein the minimum spacing is not larger than a length of the specific monitoring window.

16. The method of item 15, wherein the length of the specific monitoring window is configurable.

17. The method of item 16, wherein the length of the specific monitoring window is configured as zero, one or a plurality of symbols or slots.

18. The method of item 15, wherein one of the search space sets is selected as a reference search space set; the starting time location of specific monitoring window is the starting time location of a PDCCH monitoring occasion for the reference search space set.

19. The method of item 18, wherein a search space set with a lower search space ID index is selected as the reference search space set.

In another aspect, some items as examples of the disclosure concerning a method of a NE or gNB may be summarized as follows:

20. A method, comprising:
transmitting, by a transmitter, a plurality of Control Resource Set (CORESET) configurations, a plurality of search space set configurations, and a Physical Downlink Control Channel (PDCCH) transmitted with a plurality of repetitions; wherein the plurality of repetitions of the PDCCH are transmitted from a plurality of transmitting-receiving identities, and one CORESET is associated with one search space set;
wherein the CORESET configurations and/or search space set configurations are for blind detection of linked monitoring occasions and/or linked candidates of the PDCCH with soft combining.

21. The method of item 20, wherein the plurality of CORESET configurations have the same value for Orthogonal Frequency Division Multiplexing (OFDM) symbol number and Physical Resource Block (PRB) number.

22. The method of item 20, wherein the plurality of CORESET configurations have the same value for Control Channel Element (CCE) number.

23. The method of item 20, wherein each search space set configuration comprises a selected set of PDCCH candidates per aggregation level for selecting candidates from the search space set for soft combining.

24. The method of any one of items 21 to 23, wherein the linked candidates are determined from two search space sets or two selected sets of PDCCH candidates with a one-to-one mapping scheme for soft combining.

25. The method of item 23, wherein the linked candidates are determined from two selected sets of PDCCH candidates for each aggregation level with maximizing overlapping between CCEs of different aggregation levels.

26. The method of item 20, wherein the transmitter further transmits a signaling for configuring a soft combination candidate number N for selection of candidates from a search space set configured by one of the search space set configurations.

27. The method of item 20, wherein a soft combination candidate number N is determined as a smaller one of configured PDCCH candidate numbers M among the plurality of search space sets.

28. The method of item 26 or 27, further comprising, upon determining that the soft combination candidate number N is not larger than a configured candidate number M in a search space set, allowing a remote device to select the first N candidates from the M configured candidates for soft combining.

29. The method of item 26 or 27, further comprising, upon determining that the soft combination candidate number N is larger than a configured candidate number M in a search space set, allowing a remote device to select the first N candidates among a concatenated repetitions of the M configured candidates.

30. The method of item 26 or 27, wherein, upon determining that a first search space set has a configured candidate number M1, and a second search space set has a configured candidate number M2, the transmitter further transmits a configuration parameter indicating a selection bitmap of candidates from each of the first and second search space sets.

31. The method of item 20, wherein parameters of monitoringSlotPeriodicityAndOffset, duration and monitoringSymbolsWithinSlot for the associated search space sets are configured with the same values for FDM based scheme;

parameters of duration, monitoringSymbolsWithinSlot and a periodicity derived by monitoringSlotPeriodicityAndOffset for the associated search space sets are configured with the same values for slot level TDM based scheme; and parameters of monitoringSlotPeriodicityAndOffset, and duration for the associated search space sets are configured with the same values for sub-slot level TDM based scheme.

32. The method of item 20, wherein the linked monitoring occasions are determined with slot offset, or symbol offset, based on a difference between time domain configurations from two search space sets for slot level based, or sub-slot level based, TDM scheme, respectively.

33. The method of item 33, wherein for slot level based TDM scheme, the slot offset is obtained by a differential value between slot offset value derived by monitoringSlotPeriodicityAndOffset of the two search space sets; and for sub-slot level based TDM scheme, the symbol offset is obtained by a differential value between first non-zero symbol indexes derived by monitoringSymbolsWithinSlot of the two search space sets.

34. The method of item 20, further comprising allowing a remote device to determine a specific monitoring window for the linked monitoring occasions having a first monitoring occasion in a first search space set; wherein a second monitoring occasion in a second search space set is selected with a minimum spacing between a starting time location of the second monitoring occasion and a starting time location of the specific monitoring window; and wherein the minimum spacing is not larger than a length of the specific monitoring window.

35. The method of item 34, wherein the length of the specific monitoring window is configurable.

36. The method of item 35, wherein the length of the specific monitoring window is configured as zero, one or a plurality of symbols or slots.

37. The method of item 34, wherein one of the search space sets is selected as a reference search space set; the starting time location of specific monitoring window is the starting time location of a PDCCH monitoring occasion for the reference search space set.

38. The method of item 37, wherein a search space set with a lower search space ID index is selected as the reference search space set.

In a further aspect, some items as examples of the disclosure concerning a UE or remote device may be summarized as follows:

39. An apparatus, comprising:

a receiver that receives a plurality of Control Resource Set (CORESET) configurations, a plurality of search space set configurations, and a Physical Downlink Control Channel (PDCCH) transmitted with a plurality of repetitions; wherein the plurality of repetitions of the PDCCH are transmitted from a plurality of transmitting-receiving identities, and one CORESET is associated with one search space set; and a processor that determines linked monitoring occasions and/or linked candidates for blind detection of the PDCCH with soft combining.

40. The apparatus of item 39, wherein it is expected that the plurality of CORESET configurations have the same value for Orthogonal Frequency Division Multiplexing (OFDM) symbol number and Physical Resource Block (PRB) number.

41. The apparatus of item 39, wherein it is expected that the plurality of CORESET configurations have the same value for Control Channel Element (CCE) number.

42. The apparatus of item 39, wherein each search space set configuration comprises a selected set of PDCCH candidates per aggregation level for selecting candidates from the search space set for soft combining.

43. The apparatus of any one of items 40 to 42, wherein the linked candidates are determined from two search space sets or two selected sets of PDCCH candidates with a one-to-one mapping scheme for soft combining.

44. The apparatus of item 42, wherein the linked candidates are determined from two selected sets of PDCCH candidates for each aggregation level with maximizing overlapping between CCEs of different aggregation levels.

45. The apparatus of item 39, wherein the processor configures a soft combination candidate number N for selection of candidates from a search space set configured by one of the search space set configurations.

46. The apparatus of item 39, wherein a soft combination candidate number N is determined as a smaller one of configured PDCCH candidate numbers M among the plurality of search space sets.

47. The apparatus of item 45 or 46, wherein, upon determining that the soft combination candidate number N is not larger than a configured candidate number M in a search space set, the processor selects the first N candidates from the M configured candidates for soft combining.

48. The apparatus of item 45 or 46, wherein, upon determining that the soft combination candidate number N is larger than a configured candidate number M in a search space set, the processor selects the first N candidates among a concatenated repetitions of the M configured candidates.

49. The apparatus of item 45 or 46, wherein, upon determining that a first search space set has a configured candidate number M1, and a second search space set has a configured candidate number M2, the receiver further receives a configuration parameter indicating a selection bitmap of candidates from each of the first and second search space sets.

50. The apparatus of item 39, wherein it is expected that:

parameters of monitoringSlotPeriodicityAndOffset, duration and monitoringSymbolsWithinSlot for the associated search space sets are configured with the same values for FDM based scheme;

parameters of duration, monitoringSymbolsWithinSlot and a periodicity derived by monitoringSlotPeriodicityAndOffset for the associated search space sets are configured with the same values for slot level TDM based scheme; and parameters of monitoringSlotPeriodicityAndOffset, and duration for the associated search space sets are configured with the same values for sub-slot level TDM based scheme.

51. The apparatus of item 39, wherein the linked monitoring occasions are determined with slot offset, or symbol offset, based on a difference between time domain configurations from two search space sets for slot level based, or sub-slot level based, TDM scheme, respectively.

52. The apparatus of item 52, wherein for slot level based TDM scheme, the slot offset is obtained by a differential value between slot offset value derived by monitoringSlotPeriodicityAndOffset of the two search space sets; and for sub-slot level based TDM scheme, the symbol offset is obtained by a differential value between first non-zero symbol indexes derived by monitoringSymbolsWithinSlot of the two search space sets.

53. The apparatus of item 39, wherein the processor determines a specific monitoring window for the linked monitoring occasions having a first monitoring occasion in a first search space set; wherein a second monitoring occasion in a second search space set is selected with a minimum spacing between a starting time location of the second monitoring occasion and a starting time location of the specific monitoring window; and wherein the minimum spacing is not larger than a length of the specific monitoring window.

54. The apparatus of item 53, wherein the length of the specific monitoring window is configurable.

55. The apparatus of item 54, wherein the length of the specific monitoring window is configured as zero, one or a plurality of symbols or slots.

56. The apparatus of item 53, wherein one of the search space sets is selected as a reference search space set; the starting time location of specific monitoring window is the starting time location of a PDCCH monitoring occasion for the reference search space set.

57. The apparatus of item 56, wherein a search space set with a lower search space ID index is selected as the reference search space set.

In a yet further aspect, some items as examples of the disclosure concerning a NE or gNB may be summarized as follows:

58. An apparatus, comprising:
a transmitter that transmits a plurality of Control Resource Set (CORESET) configurations, a plurality of search space set configurations, and a Physical Downlink Control Channel (PDCCH) transmitted with a plurality of repetitions; wherein the plurality of repetitions of the PDCCH are transmitted from a plurality of transmitting-receiving identities, and one CORESET is associated with one search space set;
wherein the CORESET configurations and/or search space set configurations are for blind detection of linked monitoring occasions and/or linked candidates of the PDCCH with soft combining.

59. The apparatus of item 58, wherein the plurality of CORESET configurations have the same value for Orthogonal Frequency Division Multiplexing (OFDM) symbol number and Physical Resource Block (PRB) number.

60. The apparatus of item 58, wherein the plurality of CORESET configurations have the same value for Control Channel Element (CCE) number.

61. The apparatus of item 58, wherein each search space set configuration comprises a selected set of PDCCH candidates per aggregation level for selecting candidates from the search space set for soft combining.

62. The apparatus of any one of items 59 to 61, wherein the linked candidates are determined from two search space sets or two selected sets of PDCCH candidates with a one-to-one mapping scheme for soft combining.

63. The apparatus of item 61, wherein the linked candidates are determined from two selected sets of PDCCH candidates for each aggregation level with maximizing overlapping between CCEs of different aggregation levels.

64. The apparatus of item 58, wherein the transmitter further transmits a signaling for configuring a soft combination candidate number N for selection of candidates from a search space set configured by one of the search space set configurations.

65. The apparatus of item 58, wherein a soft combination candidate number N is determined as a smaller one of configured PDCCH candidate numbers M among the plurality of search space sets.

66. The apparatus of item 64 or 65, wherein, upon determining that the soft combination candidate number N is not larger than a configured candidate number M in a search space set, the apparatus allows a remote device to select the first N candidates from the M configured candidates for soft combining.

67. The apparatus of item 64 or 65, wherein, upon determining that the soft combination candidate number N is larger than a configured candidate number M in a search space set, the apparatus allows a remote device to select the first N candidates among a concatenated repetitions of the M configured candidates.

68. The apparatus of item 64 or 65, wherein, upon determining that a first search space set has a configured candidate number M1, and a second search space set has a configured candidate number M2, the transmitter further transmits a configuration parameter indicating a selection bitmap of candidates from each of the first and second search space sets.

69. The apparatus of item 58, wherein
parameters of monitoringSlotPeriodicityAndOffset, duration and monitoringSymbolsWithinSlot for the associated search space sets are configured with the same values for FDM based scheme;
parameters of duration, monitoringSymbolsWithinSlot and a periodicity derived by monitoringSlotPeriodicityAndOffset for the associated search space sets are configured with the same values for slot level TDM based scheme; and
parameters of monitoringSlotPeriodicityAndOffset, and duration for the associated search space sets are configured with the same values for sub-slot level TDM based scheme.

70. The apparatus of item 58, wherein the linked monitoring occasions are determined with slot offset, or symbol offset, based on a difference between time domain configurations from two search space sets for slot level based, or sub-slot level based, TDM scheme, respectively.

71. The apparatus of item 71, wherein for slot level based TDM scheme, the slot offset is obtained by a differential value between slot offset value derived by monitoringSlotPeriodicityAndOffset of the two search space sets; and for sub-slot level based TDM scheme, the symbol offset is obtained by a differential value between first non-zero symbol indexes derived by monitoringSymbolsWithinSlot of the two search space sets.

72. The apparatus of item 58, wherein the apparatus allows a remote device to determine a specific monitoring window for the linked monitoring occasions having a first monitoring occasion in a first search space set; wherein a second monitoring occasion in a second search space set is selected with a minimum spacing between a starting time location of the second monitoring occasion and a starting time location of the specific monitoring window; and wherein the minimum spacing is not larger than a length of the specific monitoring window.

73. The apparatus of item 72, wherein the length of the specific monitoring window is configurable.

74. The apparatus of item 73, wherein the length of the specific monitoring window is configured as zero, one or a plurality of symbols or slots.

75. The apparatus of item 72, wherein one of the search space sets is selected as a reference search space set; the starting time location of specific monitoring window is the starting time location of a PDCCH monitoring occasion for the reference search space set.

76. The apparatus of item 75, wherein a search space set with a lower search space ID index is selected as the reference search space set.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A method performed by a user equipment (UE), the method comprising:

receiving, from a plurality of transmitting-receiving identities, a plurality of control resource set (CORESET) configurations, a plurality of search space set configurations, and a physical downlink control channel (PDCCH) transmitted with a plurality of repetitions, one CORESET being associated with one search space set; and determining linked monitoring occasions and linked candidates for blind detection of the PDCCH with soft combining, wherein the linked candidates are determined from two search space sets with a one-to-one mapping scheme for soft combining.

2. The method of claim 1, wherein the plurality of CORESET configurations have a same value for orthogonal frequency division multiplexing (OFDM) symbol number and physical resource block (PRB) number.

3. The method of claim 1, wherein the plurality of CORESET configurations have a same value for control channel element (CCE) number.

4. A user equipment (UE) for wireless communication, comprising:

at least one memory; and at least one processor coupled with the at least one memory and configured to cause the UE to:

receive, from a plurality of transmitting-receiving identities, a plurality of control resource set (CORESET)

configurations, a plurality of search space set configurations, and a physical downlink control channel (PDCCH) transmitted with a plurality of repetitions, one CORESET being associated with one search space set; and determine linked monitoring occasions and linked candidates for blind detection of the PDCCH with soft combining, wherein the linked candidates are determined from two search space sets with a one-to-one mapping scheme for soft combining.

5. The UE of claim 4, wherein the plurality of CORESET configurations have a same value for orthogonal frequency division multiplexing (OFDM) symbol number and physical resource block (PRB) number.

6. The UE of claim 4, wherein the plurality of CORESET configurations have a same value for control channel element (CCE) number.

7. The UE of claim 4, wherein each search space set configuration comprises a selected set of PDCCH candidates per aggregation level for selecting candidates from a search space set for soft combining.

8. The UE of claim 7, wherein the linked candidates are determined from two selected sets of PDCCH candidates with the one-to-one mapping scheme for soft combining.

9. The UE of claim 7, wherein the linked candidates are determined from two selected sets of PDCCH candidates for each aggregation level with maximizing overlapping between control channel elements (CCEs) of different aggregation levels.

10. The UE of claim 4, wherein the at least one processor is further configured to cause the UE to configure a soft combination candidate number N for selection of candidates from a search space set configured by one of the plurality of search space set configurations.

11. The UE of claim 4, wherein a soft combination candidate number N is determined as a smaller one of configured PDCCH candidate numbers M among a plurality of search space sets indicated by the plurality of search space set configurations.

12. The UE of claim 11, wherein the at least one processor is further configured to cause the UE to:

upon determining that the soft combination candidate number N is not larger than a configured candidate number M in a search space set, select a first N candidates from the M configured candidates for soft combining; and upon determining that the soft combination candidate number N is larger than the configured candidate number M in the search space set, select the first N candidates among concatenated repetitions of the M configured candidates.

13. The UE of claim 11, wherein the at least one processor is further configured to cause the UE to, upon determining that a first search space set has a configured candidate number M1 and a second search space set has a configured candidate number M2, receive a configuration parameter indicating a selection bitmap of candidates from each of the first and second search space sets.

14. The UE of claim 4, wherein:

parameters of monitoringSlotPeriodicityAndOffset, duration and monitoringSymbolsWithinSlot for associated search space sets are configured with same values for frequency-division multiplexing (FDM) based scheme;

parameters of duration, monitoringSymbolsWithinSlot and a periodicity derived by monitoringSlotPeriodicityAndOffset for the associated search space sets are configured with same values for slot level time-division multiplexing (TDM) based scheme; and parameters of monitoringSlotPeriodicityAndOffset, and duration for the associated search space sets are configured with the same values for sub-slot level TDM based scheme.

15. The UE of claim 4, wherein the linked monitoring occasions are determined with slot offset based on a difference between time domain configurations from two search space sets for slot level based TDM scheme, or with symbol offset based on a difference between time domain configurations from two search space sets for sub-slot level based TDM scheme.

16. The UE of claim 4, wherein the at least one processor is further configured to cause the UE to determine a specific monitoring window for the linked monitoring occasions having a first monitoring occasion in a first search space set, wherein a second monitoring occasion in a second search space set is selected with a minimum spacing between a starting time location of the second monitoring occasion and a starting time location of the specific monitoring window, and wherein the minimum spacing is not larger than a length of the specific monitoring window.

17. The UE of claim 16, wherein the length of the specific monitoring window is configurable.

18. The UE of claim 16, wherein a search space set is selected as a reference search space set, the starting time location of the specific monitoring window is a starting time location of a PDCCH monitoring occasion for the reference search space set, and the search space set with a lower search space identification (ID) index is selected as the reference search space set.

19. A method performed by a network equipment (NE), the method comprising:

transmitting a plurality of control resource set (CORE-SET) configurations and a plurality of search space set configurations, one CORESET being associated with one search space set;

determining linked monitoring occasions and linked candidates for blind detection of a physical downlink control channel (PDCCH) with soft combining, wherein the linked candidates are determined from two search space sets with a one-to-one mapping scheme for soft combining; and transmitting, via a plurality of transmitting-receiving entities associated with the NE, the PDCCH with a plurality of repetitions according to the plurality of CORE-SET configurations and the plurality of search space configurations on the linked monitoring occasions and the linked candidates.

20. A network entity (NE) for wireless communication, comprising:

at least one memory; and at least one processor couped with the at least one memory and configured to cause the NE to:

transmit a plurality of control resource set (CORESET) configurations and a plurality of search space set configurations, one CORESET being associated with one search space set;

determine linked monitoring occasions and linked candidates for blind detection of a physical downlink control channel (PDCCH) with soft combining, wherein the linked candidates are determined from two search space sets with a one-to-one mapping scheme for soft combining; and transmit, via a plurality of transmitting-receiving entities associated with the NE, the PDCCH with a plurality of repetitions according to the plurality of CORESET configurations and the plurality of search space configurations on the linked monitoring occasions and the linked candidates.

* * * * *